June 13, 1967          A. CAUNT          3,325,230

FLEXIBLE BEARING MOUNTING

Filed Nov. 20, 1963          5 Sheets-Sheet 1

INVENTOR
ALAN CAUNT
BY
ATTORNEY

June 13, 1967          A. CAUNT          3,325,230

FLEXIBLE BEARING MOUNTING

Filed Nov. 20, 1963          5 Sheets-Sheet 3

INVENTOR
ALAN CAUNT
BY
ATTORNEY

United States Patent Office 3,325,230
Patented June 13, 1967

3,325,230
FLEXIBLE BEARING MOUNTING
Alan Caunt, Oadby, England, assignor to Metalastik Limited, Leicester, England, a British company
Filed Nov. 20, 1963, Ser. No. 325,062
Claims priority, application Great Britain, Nov. 27, 1962, 44,803
8 Claims. (Cl. 308—28)

This invention relates to flexible mountings for shaft bearings and concerns flexible mountings of the kind including rubber or the like elastomeric material (hereinafter referred to as "rubber") between inner and outer nested members and flexibly supporting the inner member from the outer member, the inner member being of annular form adapted to receive and support the bearing coaxially therewith.

The invention is particularly applicable to a flexible bearing mounting for use in supporting the centre bearing of a divided propeller shaft of a motor vehicle.

Such a mounting is required to prevent or reduce the transmission of vibration from the propeller shaft to the vehicle chassis by providing radial flexibility and also to accommodate axial movement of the propeller shaft due to corresponding displacement of the driven axle when the vehicle traverses rough roads.

According to the invention, there is provided a flexible mounting of the kind described above in which the inner member has inwardly directed lips on each side to retain the bearing axially in both directions, and the inner member is split whereby it may be expanded radially, against the action of the rubber, to receive the bearing between the lips when the bearing is being assembled in the mounting.

According to a feature of the present invention, the inner member may be in two or more separate, part circular parts.

Preferably, the rubber is bonded to both the inner and outer, nested members. Alternatively, however, the rubber may be mechanically restrained between the nested members for example by lips, pegs or straps.

The invention also provides, a flexible mounting as above defined, in combination with a bearing within the inner member of the mounting and located axially thereof by the lips on the inner member, the bearing retaining the inner member in a partially expanded condition thereby radially precompressing the rubber.

Figure 1:
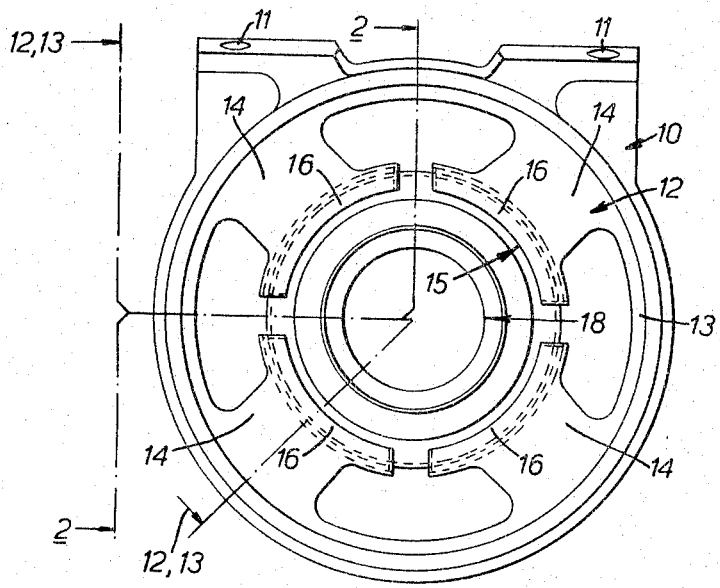
Figure 2:
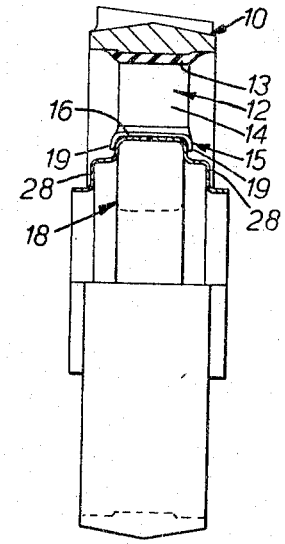
Figure 3:
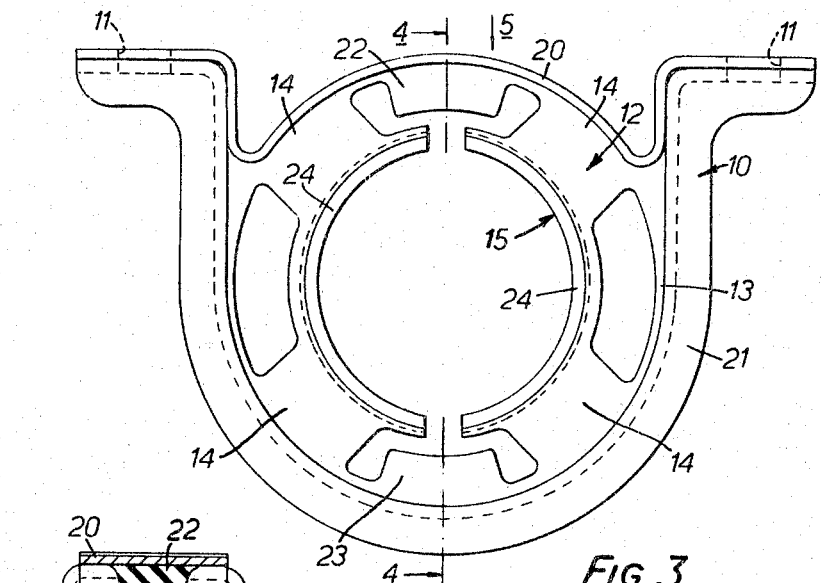
Figure 4:
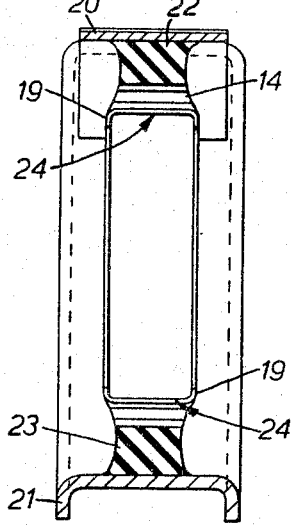
Figure 5:
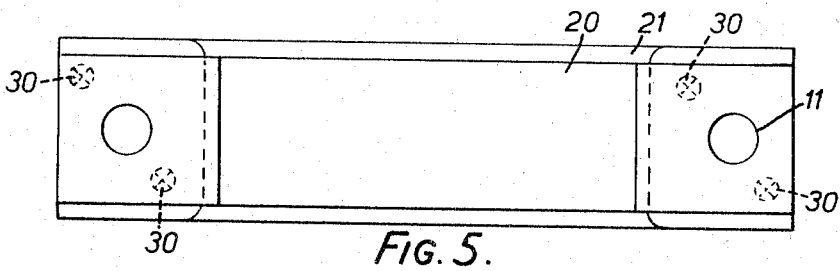
Figure 6:
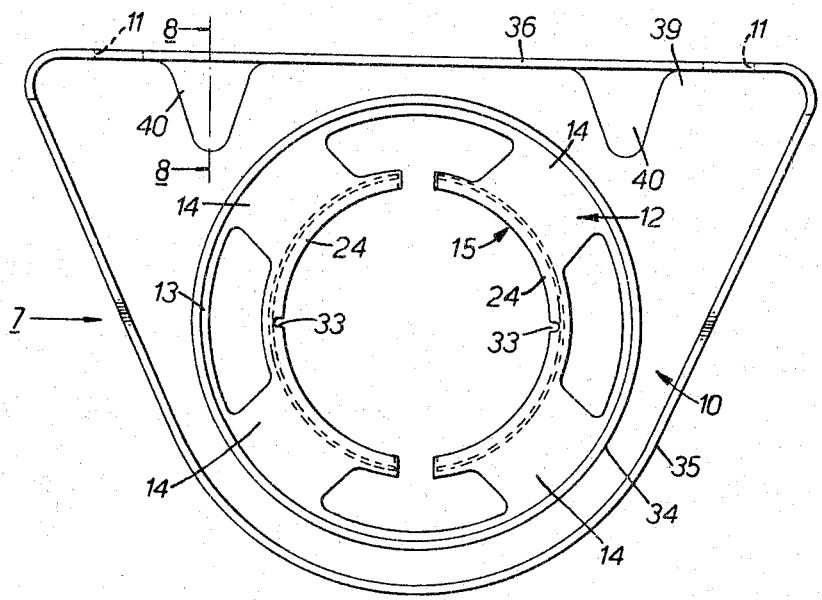
Figure 7:
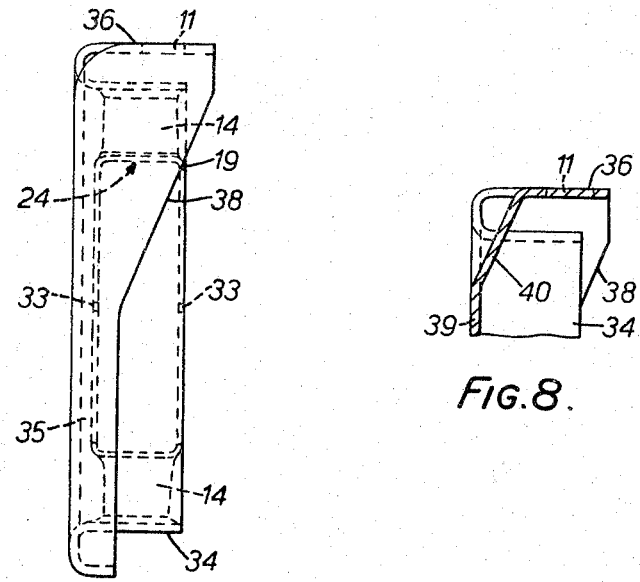
Figure 8:
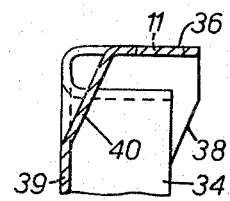
Figure 9:
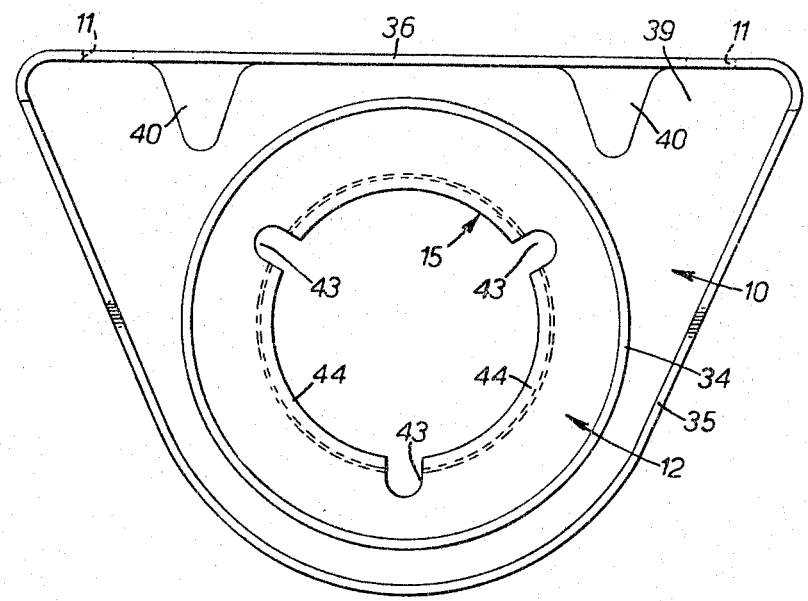
Figure 10:
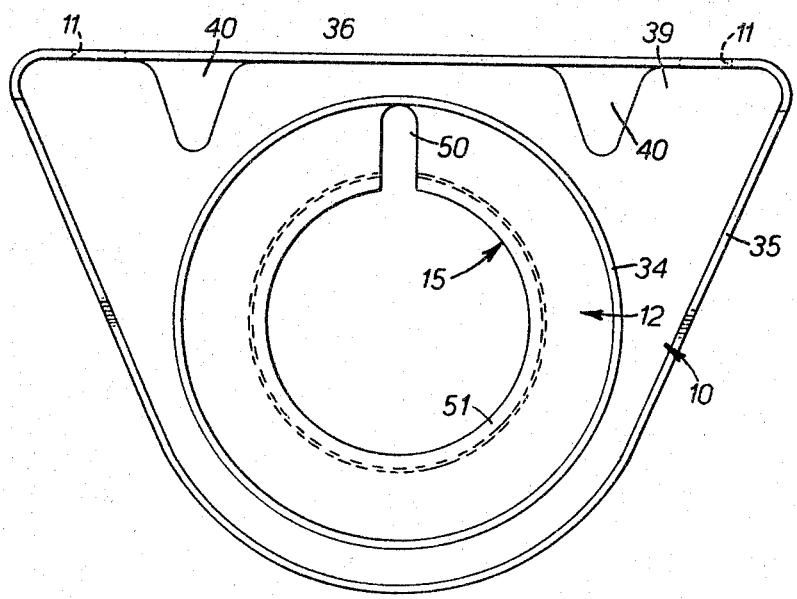
Figure 11:
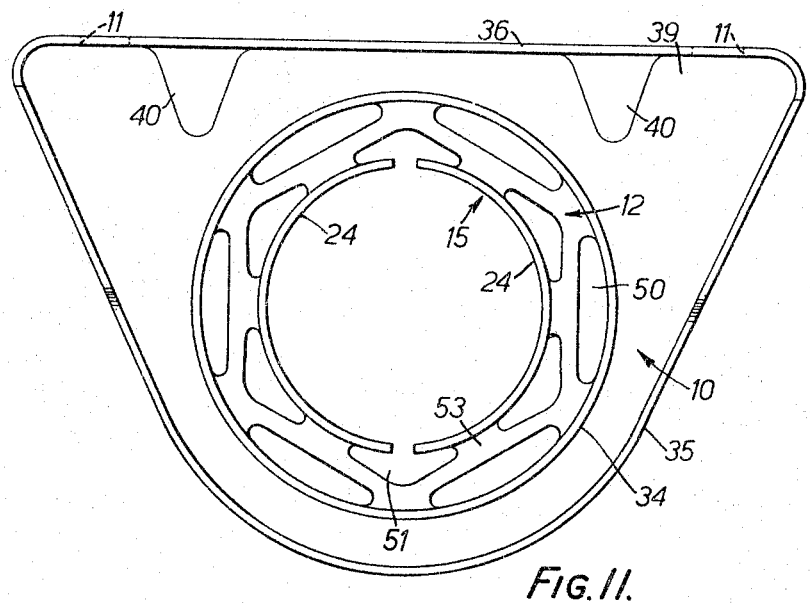
Figure 12:
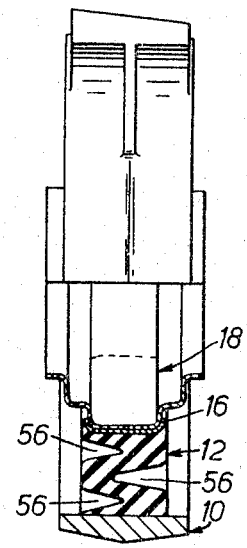
Figure 13:
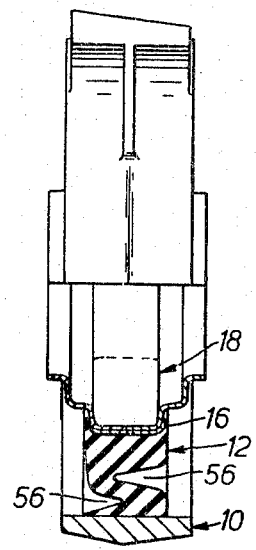
Figure 14:
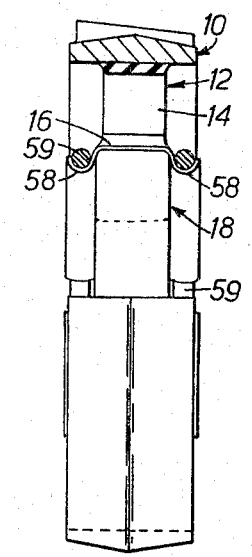

Specific embodiments of the present invention will now be described by way of example, with reference to the accompanying drawings in which:

FIG. 1 is an elevation of a flexible bearing mounting according to the invention supporting an anti-friction (ie. ball or roller) centre bearing for a divided propeller shaft of a motor vehicle, FIG. 2 is a view on line 2—2 in FIG. 1, FIG. 3 is an elevation of a further flexible bearing mounting according to the invention, FIG. 4 is a cross-section on line 4—4 in FIG. 3, FIG. 5 is a view in the direction of arrow 5 in FIG. 4, FIG. 6 is an elevation of a further flexible bearing mounting according to the invention, FIG. 7 is a view in the direction of arrow 7 in FIG. 6, FIG. 8 is a cross-section on line 8—8 FIG. 6, FIG. 9 is an elevation of a still further flexible bearing mounting according to the invention, FIG. 10 is an elevation of a still further flexible bearing mounting according to the invention, FIG. 11 is an elevation of a still further flexible bearing mounting according to the present invention, FIG. 12 is a section on line 12—12 in FIG. 1 and showing a modification, FIG. 13 is a section on line 13—13 in FIG. 1, and showing a further modification, and FIG. 14 corresponds with FIG. 2 and shows a still further modification.

Throughout the following description of the various embodiments, like parts are indicated by the same reference numerals.

Referring to FIGS. 1 and 2, the outer member of the mounting is in the form of a cast cylindrical housing 10 adapted, as at 11, for attachment to the vehicle chassis. Bonded within the housing 10 is an annular element 12 of rubber which is cored out to present a thin outer rubber ring 13 having four integral, radially inwardly directed spoke-like portions 14 expanding substantially the full width of the annular gap between the outer housing 10 and an inner member 15 (see FIG. 2). The portions 14 together support the inner member 15 which is nested within the outer housing 10. The inner member or housing 15, which is adapted to receive and support a bearing 18 coaxially therewith is made up of four separate part circular parts 16 arranged in a ring, one bonded to each of the spoke-like portions 14. The parts 16 are of channel form, see FIG. 2, to receive the bearing 18, the inner member or housing having integral inwardly directed radial flanges forming lips 19 (see FIG. 2) retaining the bearing axially.

The bearing 18 is assembled within the inner housing 15 by radially expanding the inner housing against the action of the rubber element 12, thereby radially compressing the spoke-like portions 14, either simultaneously using a tapered assembly tool to force the housing parts 16 outwardly for the insertion of the bearing or the parts 16 being forced outward consecutively by hand in order to insert the bearing in the inner housing. In the present example the bearing 18, once inserted in the inner housing 15, retains the housing in a partially expanded condition thereby radially precompressing the rubber element 12. In this way, a radial load is applied to the outer race of the bearing which assists in preventing rotation or fretting of the outer race in the inner housing. It also assists in improving the fatigue life of the rubber element 12. It is not essential to have the rubber element 12 in radial precompression however and if it is desired the rubber element may be unstrained when the bearing has been assembled in the inner housing.

The rubber element 12 may be wholly in the form of an annulus if desired—the cored out regions between the spoke-like portions 14 being filled out with rubber. Instead of having four part circular parts 16 making up the housing 15, two only need be provided the upper two and the lower two parts 16 in FIG. 1 being joined together for example so that the two parts together embrace a substantial portion of the periphery of the bearing. Again there may be three part circular parts 16 or a number greater than four if desired making up the inner housing 15. Some of these features are embodied in the constructions hereinafter described.

In the construction described with reference to FIGS. 1 and 2 annular dust shields 28 for the bearing are held clamped between the outer race and the segments 16 of the inner housing 15. These annular dust shields prevent the entry of dust and other extraneous matter into the bearing.

The outer housing 10, instead of being a casting may be fabricated from strip or sheet steel or any other suitable material and it may be in more than one piece. The segments 16 making up the inner housing 15 may be sheet metal pressings or plastics mouldings. The inner housing 15 may be formed as a ring for ease of handling during a moulding operation to form the rubber element and to bond the ring to the element, whereafter the ring is cut up to form the segments 16.

In the embodiment shown in FIGS. 3, 4 and 5, the outer housing 10 is in two parts secured together by spot welds 30 (see FIG. 5) and at bolt holes 11 when the bearing mounting is bolted to the vehicle chassis or the like. The outer housing parts consist of a base strip 20 to which is attached a channel sectioned, U-shaped strap 21. The outer housing parts are bonded to the rubber element 12. The rubber element is cored out to form four spoke-like portions 14 as before. In addition—a pair of diametrically opposed rubber buffering portions 22, 23 are formed outer element 12. The inner member or housing 15 which supports the bearings (not shown in this case) is made up of two part circular parts 24 each carried by a pair of spoke-like portions 14, the ends of the parts 24 lying opposite the buffering portions 22, 23. The buffering portions 22, 23 may be provided in the other two openings between the portions 14 if desired. Alternatively, these openings may have buffering portions like 22, 23 in addition to those buffering portions. The parts 24 are of channel form, like the parts 16, the inwardly directed flanges of the parts 24 constituting lips 19 retaining the bearing axially. The bearing is assembled within the inner housing 15 in either of the ways previously described and may or may not hold the rubber element 12 in radial precompression as desired.

In the embodiment shown in FIGS. 6, 7 and 8, the parts 24 have notches 33 in the lips 19 mid-way of their arcuate length. These assist in bending the parts 24 when forcing the bearing into position within the inner housing 15. The notches may be in different positions and more than one notch 33 in each part 24 may be provided if desired. The outer housing 10 is a sheet metal pressing of trough-like section comprising an inner upstanding, annular flange 34, to which the outer periphery of the rubber element 12 is bonded, and an outer upstanding annular flange 35 which presents a straight side 36 for the attachment of the bearing mounting to the chassis of the vehicle. To this end the straight side 36 of the flange 35 has a pair of bolt holes 11. The housing 10 is generally triangular in frontal outline. The flange 35 is of a width greater than the flange 34 along the straight side 36 and of a width less than the flange 35 around the apex of the housing the outer flange tapering from base to the apex on each side as at 38 (see FIG. 7). To support the part 36 against bending relative to the floor 39 the trough, struts 40 (see FIG. 8) of the sheet metal extend across the corner between the floor 39 and the part 36 one adjacent each hole 11.

The embodiment shown in FIG. 9 corresponds substantially with that shown in FIGS. 6, 7 and 8 except that the rubber element 12 is wholly in the form of an annulus except for local recesses 43 in its inner periphery between the adjacent ends of three channel sectioned parts 44 making up the inner housing 15. The parts 44 have lips to retain the bearing axially as before.

Instead of having three recesses 43 two only might be provided at opposite ends of a diameter, the inner housing 15 being formed in two channel sectioned parts 44 each having an arcuate extent approaching 180°.

Again a split annulus 12 of full rubber cross-section (i.e. without any coring out or recessing) may be employed. This is shown in FIG. 10. The rubber element 12 is split at 50. The inner housing 15 is likewise formed in one split annular part 51, the split in the part corresponding with that in the rubber annulus. The part 51 is of channel form having lips to retain the bearing axially.

The embodiment shown in FIG. 11 corresponds with that of FIGS. 6, 7 and 8 except that the rubber element 12, instead of being spoked, is slotted axially, there being axial holes 50 adjacent the inner flange 34 of the outer housing and axial holes 51 adjacent the parts 24 whereby the parts 24 are supported on generally tangentially extending rubber beams 53. A construction of this kind has a high radial and axial flexibility such as is required for certain applications.

To increase the radial and axial flexibility of the mounting of FIGS. 1 and 2 for example, the rubber element may have axially extending trough shaped recesses 56 cored out of the side walls of its spoke like portions 14 as shown in FIG. 12 or FIG. 13.

In any of the constructions described the lips 19 may be formed with exterior channels to receive a wire tie or split circular spring clip binding the parts of the inner housing 15 together after the bearing 18 has been positioned in the inner housing 15. This modification is shown in relation to the FIG. 1 construction in FIG. 14 where the channels are indicated at 58 and the wire or spring clip at 59. If a wire tie is used the ends of the wire are simply twisted together to form the tie. A circular spring clip is sprung into position in the channels 58. This feature may be used to retain a bearing in the mounting where the radial load is particularly high and might otherwise tend to unseat the bearing when combined with an axial load on the bearing.

With a mounting according to the present invention the bearing is readily assembled in the inner housing and likewise readily removed for subsequent repair or replacement. Compared with equivalent known mountings, a mounting according to the present invention is cheap to produce.

I claim:

1. A flexible bearing assembly comprising a bearing mounting and a shaft bearing means mounted therein, said bearing means including a bearing and annular dust shield means held in engagement with the radially outermost peripheral surface of said bearing, the mounting comprising an outer member of comparatively rigid material adapted for attachment to a part on which the bearing means is to be flexibly mounted, an inner member of comparatively rigid material and of annular form housing the bearing means, said inner member being nested within said outer member, an annular rubber element between said inner member and said outer member and physically united therewith, the rubber element flexibly supporting the inner member from the outer member, said inner member presenting inwardly directed lips on each side, said lips engaging and retaining the bearing means axially in both directions within said inner member, said inner member having at least one circumferential discontinuity allowing the inner member to be radially expanded against the action of the rubber element without circumferential straining of the inner member for the insertion of the bearing means between said lips thereby to permit mounting the bearing means in the mounting and for the withdrawal of the bearing means from between said lips thereby to permit withdrawing the bearing means from said mounting, the bearing means retaining the inner member in a partially expanded condition holding the rubber element in radial pre-compression, the rubber element thereby clamping the inner member tightly about the bearing means.

2. A flexible mounting as claimed in claim 1 wherein the rubber element is provided with axially extending recesses thereby to increase the radial and axial flexibility of the mounting.

3. A mounting as claimed in claim 1, wherein the inner member is in at least two separate, part circular parts.

4. A mounting as claimed in claim 1, wherein the inner member is of channel form having integral, inwardly directed radial flanges, the flanges constituting said lips.

5. A flexible mounting as claimed in claim 4, wherein the flanges are notched to facilitate radially expanding the inner member to receive the bearing.

6. A mounting as claimed in claim 1, wherein the rubber element is cored out to present a plurality of spoke-like formations supporting the inner member from the outer member, the spoke-like formations extending substantially the full width of the annular gap between the inner and outer nested members.

7. A mounting as claimed in claim 1, wherein the rubber element is slotted axially thereby to increase the radial and axial flexibility of the mounting.

8. A mounting as claimed in claim 1, wherein said annular dust shield means is of integral one-piece construction.

References Cited

UNITED STATES PATENTS

| | | | |
|---|---|---|---|
| 1,483,903 | 2/1924 | Masury. | |
| 1,839,094 | 12/1931 | Geyer | 308—71 |
| 1,985,781 | 12/1934 | Hufferd et al. | 308—26 |
| 2,494,815 | 1/1950 | Jadoul | 308—26 |
| 2,722,464 | 11/1955 | Galaba | 308—26 |
| 2,897,023 | 7/1959 | Burkhalter et al. | 308—28 X |
| 3,115,375 | 12/1963 | Haller | 308—72 |
| 3,140,901 | 7/1964 | Young | 308—26 |
| 3,215,477 | 11/1965 | Arthur | 308—26 |

FOREIGN PATENTS

| | | |
|---|---|---|
| 247,124 | 9/1963 | Australia. |
| 1,187,749 | 3/1959 | France. |
| 775,212 | 5/1957 | Great Britain. |

MARTIN P. SCHWADRON, *Primary Examiner.*

DAVID J. WILLIAMOWSKY, *Examiner.*

N. ABRAMS, R. F. HESS, *Assistant Examiners.*